Aug. 29, 1961   R. P. LARSEN   2,998,150
COMBINED BOAT TRAILER AND SHELTER
Filed Aug. 19, 1957   2 Sheets-Sheet 1
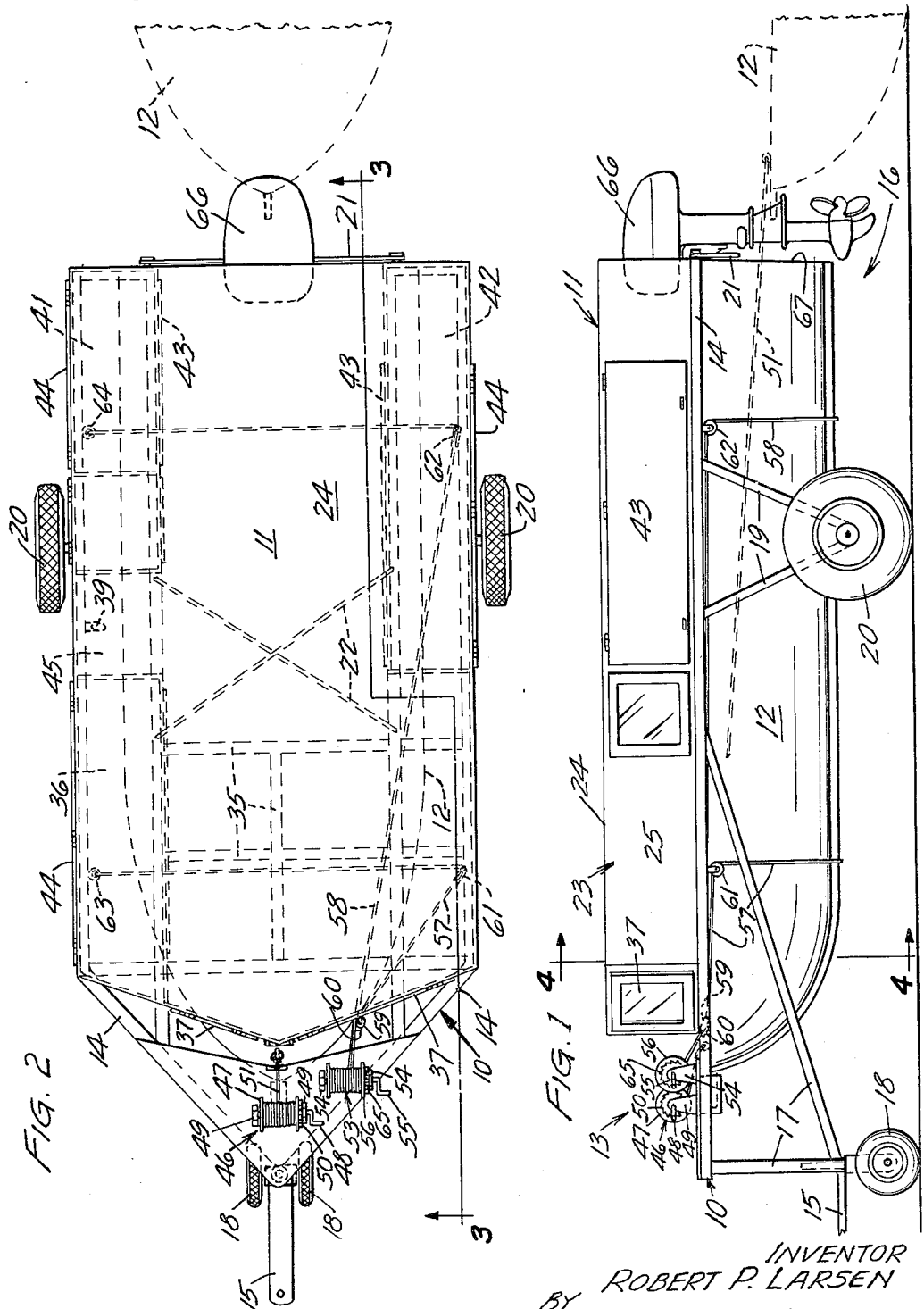
INVENTOR
ROBERT P. LARSEN
BY
Williamson, Schroeder, Adamo & Meyers
ATTORNEYS Aug. 29, 1961  R. P. LARSEN  2,998,150
COMBINED BOAT TRAILER AND SHELTER
Filed Aug. 19, 1957  2 Sheets-Sheet 2
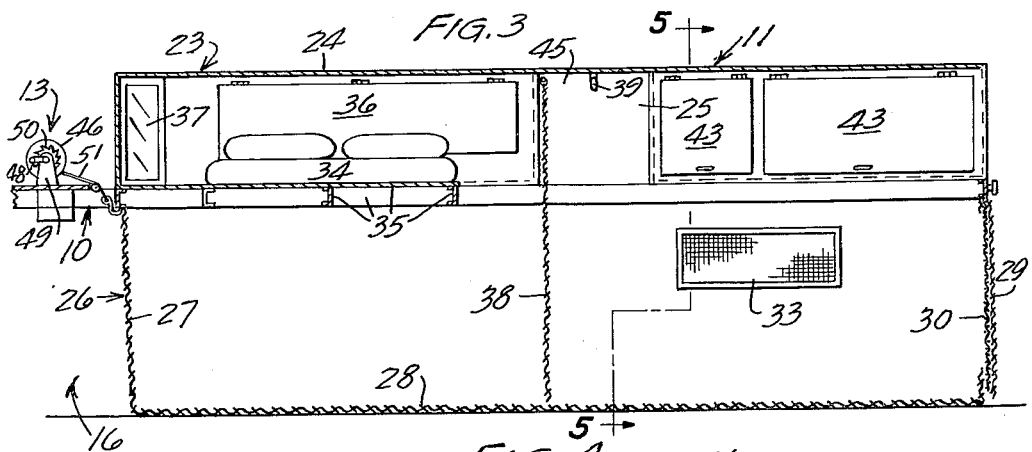
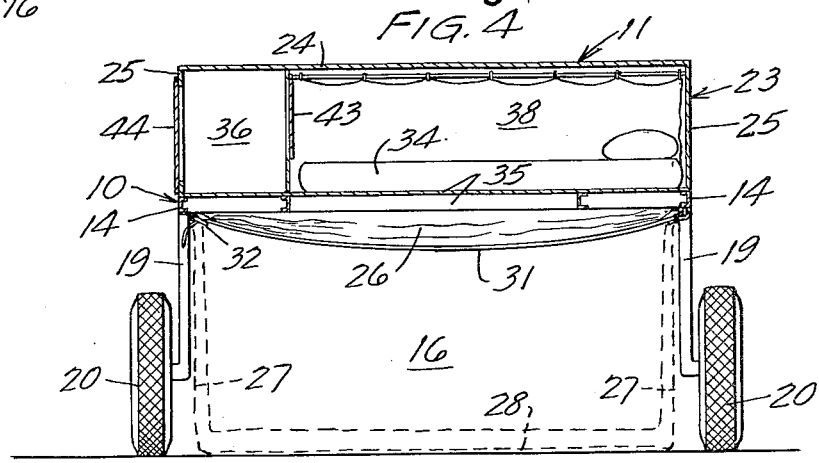
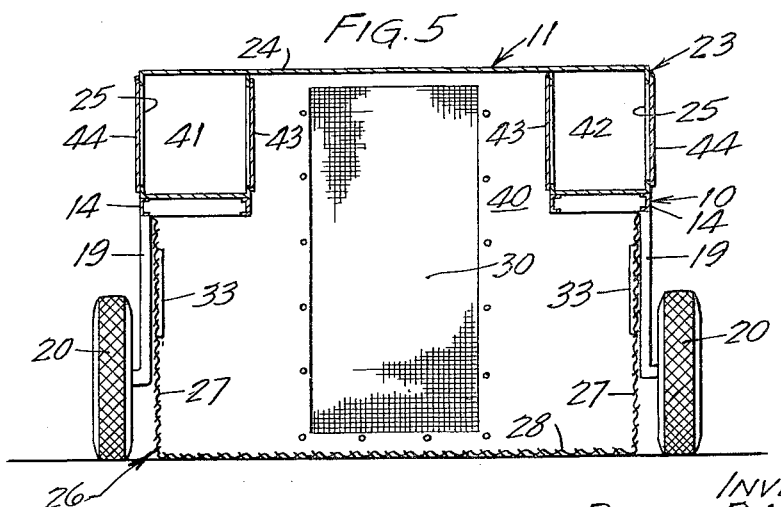
INVENTOR
ROBERT P. LARSEN
BY
Williamson, Schroeder, Adams & Meyers
ATTORNEYS

United States Patent Office 2,998,150
Patented Aug. 29, 1961

2,998,150
COMBINED BOAT TRAILER AND SHELTER
Robert P. Larsen, 5146 Sheridan Ave. N.,
Minneapolis, Minn.
Filed Aug. 19, 1957, Ser. No. 678,900
7 Claims. (Cl. 214—394)

This invention relates to a combined boat trailer and shelter, and more particularly to a trailer structure having a permanently attached shelter which is collapsible to cooperate with a removable boat.

It is an important object of the invention to provide a trailer structure which will hold a boat in cradled relation and have a collapsed shelter in protective relation therewith, said boat being conveniently removable from the trailer and the shelter expansible in its mounted condition upon the trailer structure to provide living quarters.

Another object of the invention is to provide a trailer having a collapsible shelter which will be permanent and rigidly formed at its upper portion, and flexible at its lower portion, the upper portion being capable of holding a bed structure and storage areas while the lower portion is capable of being retracted to create carrying space for a boat.

A further object of the invention is to provide a wheeled trailer, convertible to a shelter, which is capable of transporting a boat together therewith, said boat being so positioned and secured as to be capable of transporting together with the trailer and shelter portions either on land or on water.

These and other objects and advantages of my invention will more fully appear from the following description, made in connection with the accompanying drawings, wherein like reference characters refer to the same parts throughout the several views and in which:

FIGURE 1 is a side elevation of my invention showing the shelter in collapsed condition and a boat properly mounted on the trailer, the extended position of the boat being shown in part in dotted line structure;

FIGURE 2 is a top view of my trailer assembly, portions thereof being cut away to better show the internal structure and other hidden parts being shown in dotted line;

FIGURE 3 is a somewhat enlarged vertical section taken on the line 3—3 of FIGURE 2, the boat being removed and the lower flexible member of the shelter being lowered to the ground;

FIGURE 4 is another enlarged section taken on the line 4—4 of FIGURE 1 the boat being removed and the lowered position of the shelter being indicated in dotted configuration; and FIGURE 5 is another enlarged section taken on the line 5—5 of FIGURE 3.

With continued reference to the drawings, and particularly to FIGURES 1 and 2, my trailer assembly comprises generally a wheeled supporting frame 10, a shelter structure 11, a boat 12, and boat pulling and elevating mechanisms 13.

It is intended that the wheeled supporting frame 10 be so constructed that the shelter structure 11 can be supported thereon and a lower portion thereof be raised when not in use as a shelter to provide means for boat 12 to be positioned thereunder and protected by the shelter. When so arranged, the trailer assembly may be transported from place to place and the boat 12 may be launched or removed from the assembly so as to make possible the setting-up of living quarters by dropping the collapsed flexible portion of the shelter 11 to create shelter space with usual facilities such as sleeping quarters and cooking and storage provisions.

The wheeled supporting frame 10 has a main frame member 14 which is symmetrically arranged with respect to the drawbar 15 disposed at the front of the assembly. The frame 14 defines an open boat-receiving space 16, as shown in FIGURE 2. Additional brace members 17 may be provided at the forward end for attaching drawbar 15 and for securing a dolly wheel 18 pivotally thereto. Downwardly extending supports 19 at each side of the main frame 14 carry rubber tired wheels 20 while maintaining the open and unobstructed space 16 for lowering the shelter 11 when the boat is removed, as shown in FIGURE 5. A removable bar 21 may be secured across the rear end of main frame 14 so as to give addition support to a boat 12 when suspended for transportation. If desired for additional rigidity of the framework when transporting the trailer assembly, removable cross braces 22 may be secured to the main frame 14 in the manner and in the position shown in FIGURE 2.

The shelter 11 is mounted on the main frame 14 in permanent relation thereto and has an upper rigid member 23 having depending top 24 and depending side wall portions 25 extending marginally around the top 14. The height of the upper shelter member 23 is selected so that it may provide bunk spaced and sufficient space for utility shelves and the like which will be described later in the specification.

The lower flexible shelter member 26 also forms a part of the shelter 11 and comprises depending wall members 27 which may be secured closely adjacent the lower of the short depending wall members 25 of the upper rigid structure 23. A floor 28 which may also be constructed of canvas may be secured marginally to the flexible walls 27 so as to create a completely enclosed structure when the lower shelter member 26 is permitted to fall to the ground, as shown in FIGURES 3, 4 and 5. The lower shelter member 26 may be provided with a flexible flap door 29 and an inner screen door 30, if desired. When the lower shelter portion 26 is raised, no additional articles or structure need be disposed therewithin, the entire flexible wall and floor structure being collapsible upwardly to closely underlie the upper rigid shelter member 23. When thus raised, retaining means such as straps 31 may be secured under the collapsed portion, as shown in FIGURE 4. Straps 31 may be looped at their ends about opposed portions of main frame 14 and may be provided with convenient fasteners such as buckles 32 for drawing up and maintaining the flexible shelter member 26 in its collapsed position. Additional openings which may be screened as at 33 may be provided in the side walls of the lower flexible shelter portion 26, as shown in FIGURE 5.

With reference to FIGURES 3 to 5, it may be observed that the rigid upper structure 23 may be provided with utility space structures capable of holding appliances, clothing, food and the like, and transporting the same even though the entire trailer assembly be utilized as a boat-carrying device. The bunk or bed portion is shown at the forward end of the rigid upper shelter portion 23 and is indicated generally at 34. The support area 35 of the bed is disposed laterally across the upper shelter structure 23 and an area 36 may be provided for bedding when the bunk is not in use. A forward window 37 may be disposed in the forwardmost of the short depending wall members 25. Immediately rearward of the bunk portion 34 is a flexible drape 38 and a clothes bar 39 is supported transversely of the rigid upper structure 23 near the roof 24 and adjacent the drape 38. The rear portion of the shelter 11 is so constructed as to provide a full length intermediate space 40 beneath the roof 24, each side of the rear portion of the shelter being provided with storage or cupboard structures 41 and 42, respectively. Each of the storage or cupboard structures 41 and 42 are provided with inner doors or closures 43 so that access may be gained thereto from within the shelter 11, and are also provided with exterior doors 44 so that access may be gained thereto from the outside even though the trailer is assembled for transportation. Thus, exterior doors 44, as shown in FIGURE 3, may be provided for refrigeration space and for appliances and cooking utensils. Since no rigid structures depend, or are supported by, the floor 28, the flexible nature thereof permits raising of the lower shelter member without interference therefrom. The rigid articles are all disposed, when the shelter is in raised condition, in the various utility compartments, and it is understood that folding chairs and the like may be placed on the supporting area of the bed 35 or in other utility spaces or compartments provided in the upper structure 23. Any members normally extending downwardly into the space created by the lowered flexible portion 26 are also of flexible nature so that they may be raised therewith when the trailer assembly is prepared for transportation. Thus, the drape 38 will naturally collapse along with the lower shelter structure 26 and any clothing 45 suspended from the clothes bar 39 will likewise be moved upwardly with the flexible lower shelter portion when it is raised.

With the shelter 11 collapsed upwardly and with the straps 31 drawn tightly to support the collapsed shelter, the boat-receiving space 16 is utilized for pulling boat 12 thereinto and in suspended relation closely underlying the collapsed portion of the shelter 11. Means for pulling the boat into position and maintaining it in suspended relation comprises a first winch 46, as shown in FIGURE 2, mounted at the forward portion of supporting frame 10 adjacent the apex of main frame 14. The winch 46 has a drum 47 and a crank 48 journaled across bearings 49 and may be provided with conventional ratchet means 50 which will prevent the unwinding of winch 46 when manual force on crank 48 is released. A cable 51 is secured to the drum 47 and extends rearwardly for engagement with boat 12 at 52, as shown in the dotted line position of FIGURE 1. A second winch mechanism 53 is mounted slightly rearwardly of the winch 46 and also is provided with bearings 54 secured to the frame 10 and has journaled thereacross a crank shaft 55 to which is secured a drum 56 in the manner shown in FIGURES 1 and 2. A pair of cables 57 and 58 are secured to the drum 56 and extend rearwardly through respective pulleys 59 and 60, which in turn are secured at a forward position on the rigid upper shelter structure 23, as shown in FIGURE 2. From the respective pulleys 59 and 60, the cables 57 and 58 are trained rearwardly to another pair of respective pulleys 61 and 62 at one side of the rigid upper shelter structure 23 and from these pulleys the cables 57 and 58 extend transversely underneath the shelter 11 to respective anchoring points 63 and 64 at the opposite side of the shelter 11. The cables 57 and 58 are relaxed so as to lie on the ground when the boat 12 is pulled forwardly. Then, when the boat has been pulled by winch 46 to a position underlying the shelter 11, the second winch means 53 is rotated to draw up the cables 57 and 58 and bring the boat 12 to the position shown in FIGURE 1 where it is protected and suspended in closely underlying relation with respect to shelter 11. The second winch means 53 may also be provided with a conventional ratchet mechanism 65 which will prevent the accidental unwinding of the winch 53 during suspension of the boat 12.

A motor such as outboard motor 66 may be mounted on the transom 67 of boat 12 and permitted to remain in that position during transportation. The transverse supporting bar 21 serves to assist in supporting the boat and motor structure when in raised position as shown in FIGURES 1 and 2.

The use and operation of my trailer assembly will be evident from the foregoing. It may be pointed out, however, that the boat 12 can be so centered with respect to the trailer structure 10 and the shelter 11 that the entire assemblage may be transported by water as, for example, when setting-up camp on an island. The motor 66 is then operated from a position on top of the shelter roof 24 until the rubber tired wheels 20 and dolly wheel 18 are beached. The entire trailer assembly can then be manually moved to its desired location, first having removed its boat and motor from the trailer assembly.

It may thus be seen that I have devised a novel trailer assembly wherein a shelter is so constructed as to collapse and cooperatively overlie a suspended boat removable from the assembly to permit the shelter to be extended ready for use. It will be noted that the entire trailer assembly has over-all dimensions when loaded for transportation which are not substantially greater than the dimensions of a conventional suspension-type trailer and boat without the additional benefit of the shelter.

It will, of course, be understood that various changes may be made in the form, details, arrangement and proportions of the parts without departing from the scope of my invention.

What I claim is:

1. A trailer assembly comprising, a generally horizontal wheeled supporting frame having an unobstructed medial area, a shelter structure mounted on said supporting frame and having a roof area disposed over, and a depending flexible wall portion secured edgewise peripherally of said roof area and disposed within, the unobstructed area, said flexible wall portion being collapsible upwardly under the roof area to define a boat-receiving space, and means for supporting a boat closely under the upwardly collapsed flexible wall portion.

2. A trailer assembly comprising, a generally horizontal wheeled supporting frame having an unobstructed medial area, a shelter structure mounted on said supporting frame and having a roof area disposed over, and a depending flexible wall portion secured edgewise peripherally of said roof area and disposed within, the unobstructed area, said flexible wall portion being collapsible upwardly under the roof area to define a boat-receiving space, means securable across the supporting frame for holding the flexible wall portion in upwardly collapsed position, and means for supporting a boat closely under the upwardly collapsed flexible wall portion.

3. A trailer assembly comprising, a generally horizontal wheeled supporting frame having an unobstructed medial area, a shelter structure mounted on said supporting frame and having a roof area disposed over, and a depending flexible wall portion secured edgewise peripherally of said roof area and disposed within, the unobstructed wall area, said flexible wall portion being collapsible upwardly under the roof area to define a boat-receiving space, means securable across the supporting frame for holding the flexible wall portion in upwardly collapsed position, and winch means adapted to pull a boat under the upwardly collapsed flexible wall portion and retain said boat thereunder.

4. A trailer assembly comprising, a generally wheeled supporting frame having an unobstructed medial area, a shelter structure mounted on said supporting frame and having a roof, a depending flexible wall portion secured at its upper edge peripherally about said roof and a transverse bottom sheet secured peripherally to the lower edge of said flexible wall portion and defining a floor disposed within the unobstructed area, said floor and said flexible wall portion being collapsible upwardly to define a boat-receiving space, means securable across the supporting frame for holding the floor and flexible wall portion in upwardly collapsed position, winch means adapted to pull a boat under the upwardly collapsed flexible wall portion, and second winch means adapted to raise the boat in cradled and protected relation against the underside of said floor.

5. A trailer assembly comprising, a generally horizontal wheeled supporting frame having an unobstructed medial area, a permanently formed upper shelter member secured to said frame in elevated relation with respect to the ground, said upper shelter member defining a roof and short depending walls disposed marginally thereabout within said unobstructed medial area, a flexible lower shelter member defining a continuous wall secured in depending relation to said short depending walls, said flexible lower shelter member being capable of collapsing upwardly in closely underlying relation with the short depending walls to define a boat-receiving space, and means adapted to suspend a boat on the wheeled supporting frame in closely underlying relation with the flexible lower shelter member in its upwardly collapsed condition.

6. The structure set forth in claim 5, and utility space structures mounted within the permanently formed upper shelter member, said utility space structures having doorways in said short depending walls for access thereto externally of the assembly.

7. The structure set forth in claim 6, wherein one of said utility space structures has a bed secured laterally across the permanently formed upper shelter member.

References Cited in the file of this patent

UNITED STATES PATENTS

| | | |
|---|---|---|
| 2,202,747 | Roloson | May 28, 1940 |
| 2,543,349 | Britton | Feb. 29, 1951 |
| 2,772,912 | Neff | Dec. 4, 1956 |